(12) United States Patent
Sato

(10) Patent No.: US 11,887,457 B2
(45) Date of Patent: Jan. 30, 2024

(54) INFORMATION PROCESSING DEVICE, METHOD, AND PROGRAM

(71) Applicant: SONY GROUP CORPORATION, Tokyo (JP)

(72) Inventor: Tatsuhito Sato, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 17/624,676

(22) PCT Filed: Jun. 29, 2020

(86) PCT No.: PCT/JP2020/025574
§ 371 (c)(1),
(2) Date: Jan. 4, 2022

(87) PCT Pub. No.: WO2021/024649
PCT Pub. Date: Feb. 11, 2021

(65) Prior Publication Data
US 2022/0262225 A1 Aug. 18, 2022

(30) Foreign Application Priority Data

Aug. 2, 2019 (JP) ................................ 2019-143079

(51) Int. Cl.
*G08B 21/00* (2006.01)
*G08B 21/04* (2006.01)
(Continued)

(52) U.S. Cl.
CPC ......... *G08B 21/0423* (2013.01); *G06V 20/52* (2022.01); *G06V 40/172* (2022.01); *B25J 9/0003* (2013.01)

(58) Field of Classification Search
CPC ............ G08B 21/0423; G08B 13/1672; G08B 13/1968; G08B 13/19647; G08B 25/001;
(Continued)

(56) References Cited

U.S. PATENT DOCUMENTS 6,977,585 B2    12/2005  Falk
2017/0053504 A1  2/2017  Zhang
(Continued)

FOREIGN PATENT DOCUMENTS

JP    2004-056664 A    2/2004
JP    2005-173668 A    6/2005
(Continued)

*Primary Examiner* — Ojiako K Nwugo
(74) *Attorney, Agent, or Firm* — Paratus Law Group, PLLC

(57) ABSTRACT

An information processing device (1) includes: a transmission unit (32) that transmits, on the basis of rule information set in advance and a sensing result by a sensor (2) that senses environment information on a predetermined area, notification information based on the sensing result to a terminal device (10); a reception unit (31) that receives, from the terminal device (10), feedback information for the notification information transmitted by the transmission unit (32); and an update unit (57) that updates the rule information on the basis of the feedback information received by the reception unit (31).

19 Claims, 14 Drawing Sheets

(51) Int. Cl.
  *G06V 20/52* (2022.01)
  *G06V 40/16* (2022.01)
  *B25J 9/00* (2006.01)

(58) Field of Classification Search
  CPC .. G08B 13/19697; G08B 21/00; G08B 25/04;
        G08B 25/10; G06V 20/52; G06V 40/172;
        B25J 9/0003; G10L 25/51; G10L 17/26
  See application file for complete search history.

(56) References Cited

U.S. PATENT DOCUMENTS

| | | | |
|---|---|---|---|
| 2017/0269016 A1* | 9/2017 | Anjum | G01W 1/02 |
| 2018/0307253 A1* | 10/2018 | Weiler | G05D 7/0617 |
| 2019/0278001 A1* | 9/2019 | Campbell | G01W 1/02 |
| 2020/0007960 A1* | 1/2020 | Campbell | G01N 33/246 |

FOREIGN PATENT DOCUMENTS

| | | | |
|---|---|---|---|
| JP | 2006-155451 A | 6/2006 |
| JP | 2007-068149 A | 3/2007 |
| JP | 2008-197879 A | 8/2008 |
| JP | 2011-250161 A | 12/2011 |
| JP | 2012-100005 A | 5/2012 |
| JP | 2013-077258 A | 4/2013 |
| JP | 2013-222216 A | 10/2013 |
| JP | 2018-094683 A | 6/2018 |

* cited by examiner

| PERSON ID | FEATURE VALUE | NAME | ... |
|---|---|---|---|
| A001 | B001 | TARO YAMADA | ... |
| A002 | B002 | HANAKO YAMADA | ... |
| ... | ... | ... | ... |

| DAILY LIFE SOUND ID | FEATURE VALUE | REGISTRATION INFORMATION | ... |
|---|---|---|---|
| C001 | D001 | INITIAL SETTING | ... |
| C002 | D002 | 2019/7/13 | ... |
| ... | ... | ... | ... |

FIG.7

| IMAGE DATA | IMAGING TIME | IMAGING POSITION | IMAGING DIRECTION | FEATURE VALUE | PERSON ID | ... |
|---|---|---|---|---|---|---|
| E001 | 2019/7/15 7:45 | F001 | G001 | B001 | A0001 (TARO YAMADA) | ... |
| E002 | 2019/7/15 9:23 | F002 | G002 | B023 | - (UNREGISTERED) | ... |
| ... | ... | ... | ... | ... | ... | ... |

FIG.8

| SOUND DATA | RECORDING TIME | RECORDING POINT | SOUND SOURCE | FEATURE VALUE | DAILY LIFE SOUND ID | ... |
|---|---|---|---|---|---|---|
| E001 | 2019/7/15 7:45 | F001 | F004 | G001 | F001 | ... |
| E002 | 2019/7/15 9:23 | F002 | F008 | G023 | - | ... |
| ... | ... | ... | ... | ... | ... | ... |

| CONDITION ID | DATA TYPE | TRANSMISSION CONDITION | | ... | |
| :---: | :---: | :---: | :---: | :---: | :---: |
| | | TIME | POSITION | ... | |
| E001 | IMAGE DATA | 9:00 TO 15:00 | - | ... | ... |
| E002 | SOUND DATA | - | OTHER THAN F004 | ... | ... |
| ... | ... | ... | ... | ... | ... |

| DAILY LIFE SOUND ID | FEATURE VALUE | REGISTRATION INFORMATION | ... |
|---|---|---|---|
| C001 | D001 | INITIAL SETTING | ... |
| C002 | D002 | 2019/7/13 | ... |
| ... | ... | ... | ... |

DELETE

| DAILY LIFE SOUND ID | FEATURE VALUE | REGISTRATION INFORMATION | ... |
|---|---|---|---|
| C001 | D001 | INITIAL SETTING | ... |
| C002 | D002 | 2019/7/13 | ... |
| ... | ... | ... | ... |

INFORMATION PROCESSING DEVICE, METHOD, AND PROGRAM

CROSS REFERENCE TO PRIOR APPLICATION

This application is a National Stage Patent Application of PCT International Patent Application No. PCT/JP2020/025574 (filed on Jun. 29, 2020) under 35 U.S.C. § 371, which claims priority to Japanese Patent Application No. 2019-143079 (filed on Aug. 2, 2019), which are all hereby incorporated by reference in their entirety.

FIELD

The present disclosure relates to an information processing device, method, and program.

BACKGROUND

There is a pet-type robot that goes around, for example, in a house and notifies a resident, a police, or the like in a case where an abnormality in the house is detected. The pet-type robot detects the abnormality described above on the basis of rule information set in advance.

CITATION LIST

Patent Literature

Patent Literature 1: JP 2018-94683 A

SUMMARY

Technical Problem

However, although it is necessary to optimize the rule information described above in accordance with an environment in which the pet-type robot is installed, it is not easy to actually perform optimization, and if a user performs the optimization, a burden on the user is large, and work for the optimization becomes complicated.

Thus, the present disclosure devises an information processing device, method, and program capable of easily optimizing the rule information.

Solution to Problem

An information processing device comprising:
a transmission unit that transmits, on a basis of rule information set in advance and a sensing result by a sensor that senses environment information on a predetermined area, notification information based on the sensing result to a terminal device;
a reception unit that receives, from the terminal device, feedback information for the notification information transmitted by the transmission unit; and
an update unit that updates the rule information on a basis of the feedback information received by the reception unit.

According to an aspect of an embodiment, the rule information can be easily optimized. Note that, effects described here are not necessarily limited, and may be any of effects described in the present disclosure.

BRIEF DESCRIPTION OF DRAWINGS

FIG. 7 is a diagram illustrating a specific example of an image database according to the embodiment.

FIG. 8 is a diagram illustrating a specific example of a sound database according to the embodiment.

DESCRIPTION OF EMBODIMENTS

Figure 1:
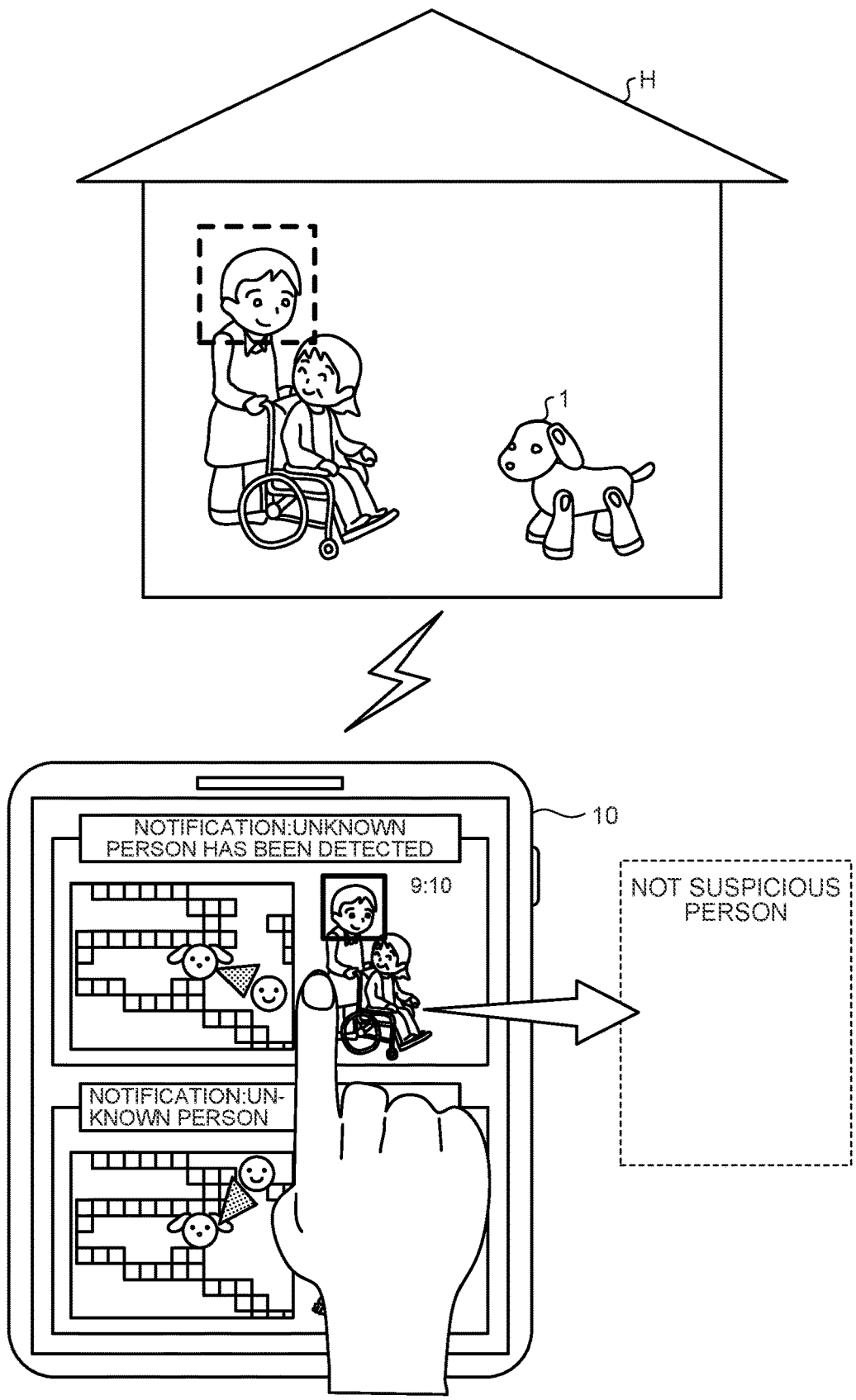
FIG. 1 is a diagram illustrating an outline of an information processing system according to an embodiment.

Hereinafter, embodiments of the present disclosure will be described in detail with reference to the drawings. Note that, each of the following embodiments, the same parts are denoted by the same reference numerals, and redundant description will be omitted.

EMBODIMENT

Configuration of System According to Embodiment

First, a description will be given of an outline of an embodiment of the present disclosure. As described above, in recent years, a technology has been developed related to a watching service for performing notification to a terminal device of a user in a case where, for example, a robot such as a pet-type robot detects an abnormality of a house or the like.

In the watching service, the robot detects an abnormality on the basis of rule information set in advance and notifies the terminal device described above of the abnormality. However, in the watching service, it is not easy to perform optimization of the rule information. Specifically, since living environment varies for each user, it is necessary to perform optimization of the rule information for each user; however, if the user oneself sets all rules, a burden on the user is large, and work for the optimization becomes complicated.

The present technical idea has been conceived by focusing on points described above, and it is possible to facilitate optimization of the rule information by updating the rule information on the basis of feedback for notification information of which the user is notified. Here, the rule information is information regarding a rule when the notification information is transmitted, and includes dictionary information and condition information to be described later.

First, with reference to FIG. 1, a description will be given of a configuration example of an information processing system according to the present embodiment. FIG. 1 is a diagram illustrating the outline of the information processing system according to the present embodiment. As illustrated in FIG. 1, the information processing system according to the embodiment includes an information processing device 1 and a terminal device 10. Note that, in the following, a case will be described where the information processing device 1 is a pet-type robot as illustrated in FIG. 1; however, the information processing device 1 may be a humanoid robot, a cleaning robot, a drone, or the like instead of the pet-type robot. Furthermore, the information processing device 1 may be a fixed type or may be worn on an actual pet (for example, a dog). Note that, the pet-type robot is an example of a mobile robot.

In the example of FIG. 1, the information processing device 1 is, for example, a pet-type robot, goes around in a house H, and detects an event in the house H on the basis of a detection result by a sensor that senses environment information in the house H. Note that, in the following, a case will be described where an abnormality is detected as an event; however, the event is not limited to an abnormality and can be arbitrarily changed.

As will be described later with reference to FIG. 2, the information processing device 1 includes a microphone sensor 22 and a camera sensor 23, and can detect an abnormal sound, a suspicious person, or the like in the house H on the basis of sound data collected by the microphone sensor 22 or image data imaged by the camera sensor 23.

Then, upon detecting an abnormality in the house H, the information processing device 1 transmits notification information based on the abnormality to the terminal device 10 of the user. The example illustrated in FIG. 1 illustrates a scene where the information processing device 1 has detected a home helper who assists a resident as a suspicious person.

Upon receiving the notification information, the terminal device 10 displays image data in which the home helper has been detected, that is, information regarding data that is a basis of the abnormality, a detection time, a position of the camera sensor, angle of view, position of the home helper when the image data has been imaged, and the like.

For example, the terminal device 10 generates feedback information for the notification information on the basis of operation of the user for the notification information, and transmits the feedback information to the information processing device 1. In the example illustrated in FIG. 1, in a case where the user performs flick operation to the right, the terminal device 10 transmits, to the information processing device 1, feedback information indicating that a person (home helper) reflected in the image data is not a suspicious person.

As a result, the information processing device 1 can identify that the home helper is not a suspicious person on the basis of the feedback information, and updates the rule information described above. That is, the information processing device 1 registers the home helper as a person other than the suspicious person in the rule information, whereby it is not necessary to detect the home helper as the suspicious person in subsequent processing.

Thus, the information processing device 1 does not transmit the notification information indicating that the home helper is a suspicious person to the terminal device 10 in the subsequent processing, so that unnecessary notification information for the terminal device 10 can be reduced.

As described above, the information processing device 1 can gradually refine the rule information by sequentially updating the rule information on the basis of the feedback information for the notification information. Thus, according to the information processing device 1, the user does not need to set detailed rule information in advance, and the rule information can be optimized by simple operation, so that the optimization of the rule information can be facilitated.

Configuration of Information Processing Device According to Embodiment

Next, with reference to FIG. 2, a description will be given of a configuration example of the information processing device 1 according to the embodiment. FIG. 2 is a block diagram illustrating the configuration example of the information processing device 1 according to the embodiment. Note that, although not illustrated in FIG. 2, the information processing device 1 includes a movement mechanism for moving in the house H. Furthermore, in the following, a description will be given assuming that the information processing device 1 goes around a predetermined area (in the house H) at a cycle or time set in advance, for example.

Figure 2:
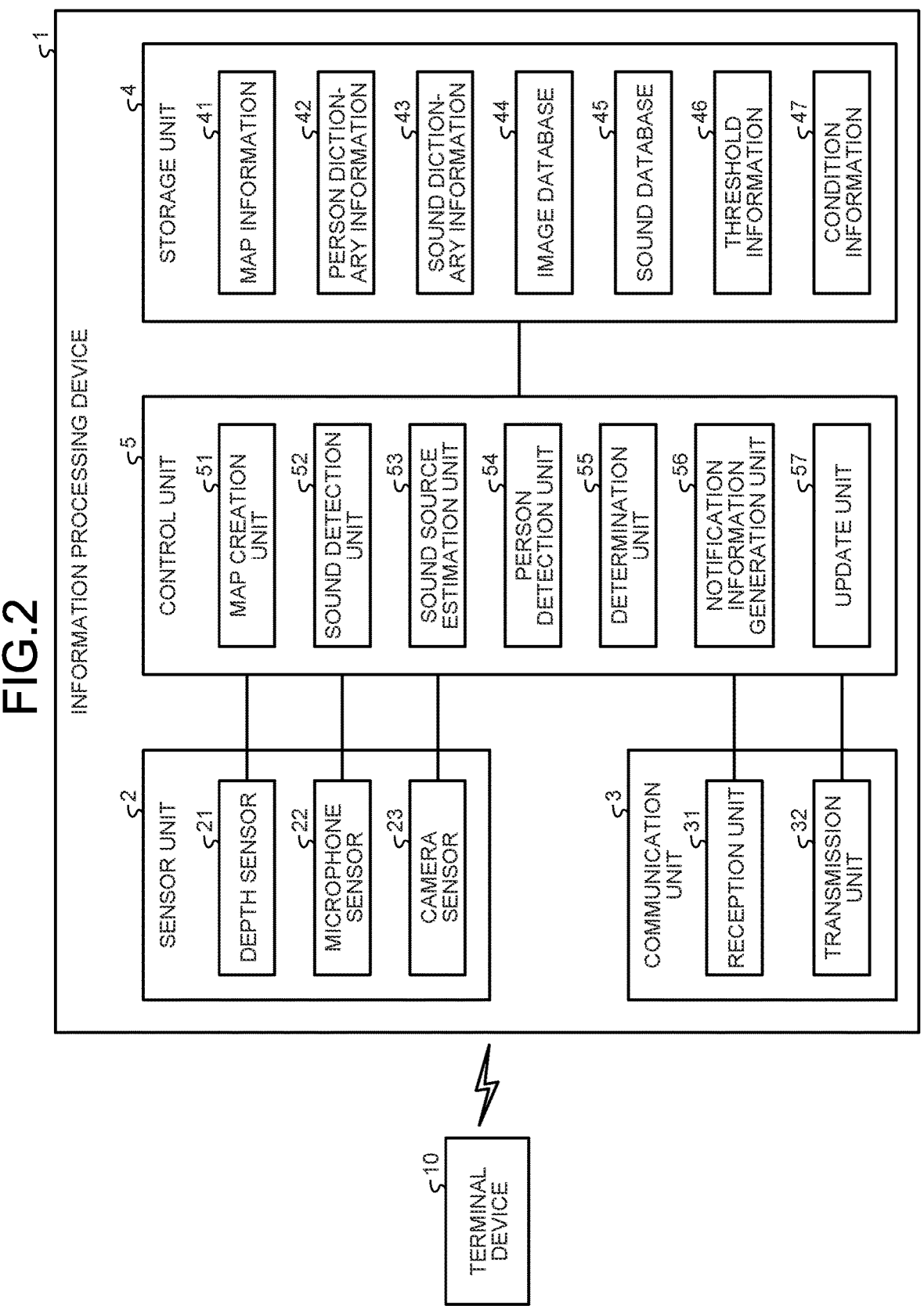
FIG. 2 is a block diagram illustrating a configuration example of an information processing device according to an embodiment.

As illustrated in FIG. 2, the information processing device 1 includes a sensor unit 2, a communication unit 3, a storage unit 4, and a control unit 5. The sensor unit 2 includes a sensor that senses environment information in the predetermined area (in the house H). In the example illustrated in FIG. 2, the sensor unit 2 includes a depth sensor 21, the microphone sensor 22, and the camera sensor 23.

The depth sensor 21 is a device that acquires depth information, such as an infrared distance measuring device, an ultrasonic distance measuring device, laser imaging detection and ranging (LiDAR), or a stereo camera. The microphone sensor 22 is a device that collects ambient sound and outputs sound data converted into a digital signal via an amplifier and an analog digital converter (ADC). The camera sensor 23 is an imaging device that includes a lens system and an imaging element and images an image (still image or moving image), such as an RGB camera.

Note that, the information processing device 1 may acquire a sensing result in a predetermined area from the sensor unit 2 provided separately from the information processing device 1. Furthermore, in a case where the information processing device 1 is not a mobile robot, that is, in a case where the sensor unit 2 is fixed, a plurality of the sensor units 2 may be provided.

The communication unit 3 is a communication module that transmits and receives data to and from the terminal device 10 via a predetermined network. Furthermore, the communication unit 3 includes a reception unit 31 and a transmission unit 32. The reception unit 31 receives the feedback information described above from the terminal device 10 and notifies the control unit 5 of the feedback information. The transmission unit 32 transmits the notification information described above to the terminal device 10.

The storage unit 4 stores map information 41, person dictionary information 42, sound dictionary information 43, an image database 44, a sound database 45, threshold information 46, and condition information 47.

Figures 3, 4:
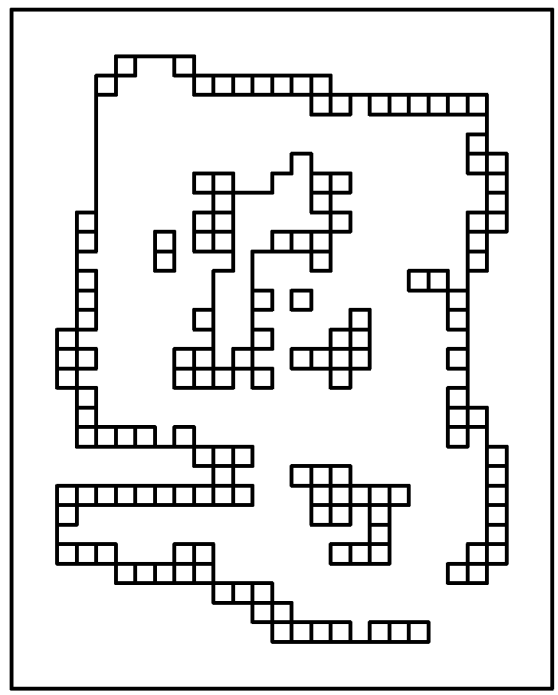
FIG. 3 is a diagram illustrating a specific example of map information according to the embodiment.
FIG. 4 is a diagram illustrating a specific example of person dictionary information according to the embodiment.

The map information 41 is information regarding a map in the house H, and is information generated by the control unit 5 to be described later on the basis of, for example, depth information input from the depth sensor 21. FIG. 3 is a diagram illustrating a specific example of the map information 41 according to the embodiment. As illustrated in FIG. 3, the storage unit 4 stores space information in the house H as map information 41. The map information 41 is information indicating an obstacle (a wall, furniture, or the like), a layout, and the like.

Returning to the description of FIG. 2, a description will be given of the person dictionary information 42. The person dictionary information 42 is an example of the dictionary information, and is information serving as a reference of detecting an event. In the present embodiment, the person dictionary information 42 is information regarding a feature value on image data of a permitted user registered by the user. FIG. 4 is a diagram illustrating a specific example of the person dictionary information 42 according to the embodiment.

As illustrated in FIG. 4, the person dictionary information 42 is information in which "person ID", "feature value", "name", and the like are associated with each other. The "person ID" is an identifier for identifying each permitted user. The "feature value" indicates a feature value of a corresponding permitted user. In more detail, the feature value is a feature value of the face of the permitted user. Note that, in the example illustrated in FIG. 4, the feature value is indicated by being abstracted as "B001" or the like, but specific information is assumed to be stored in "B001".

The "name" indicates a name of a corresponding person. Note that, the person dictionary information 42 may include information regarding an attribute of a permitted user. The attribute here includes, for example, a family, a friend, a guest, and the like.

Furthermore, the user can register image data of the family in the person dictionary information 42 at the time of initial setting, for example, but can also register a new permitted user in the person dictionary information 42 by feedback operation for the notification information displayed on the terminal device 10.

Figures 5, 6:
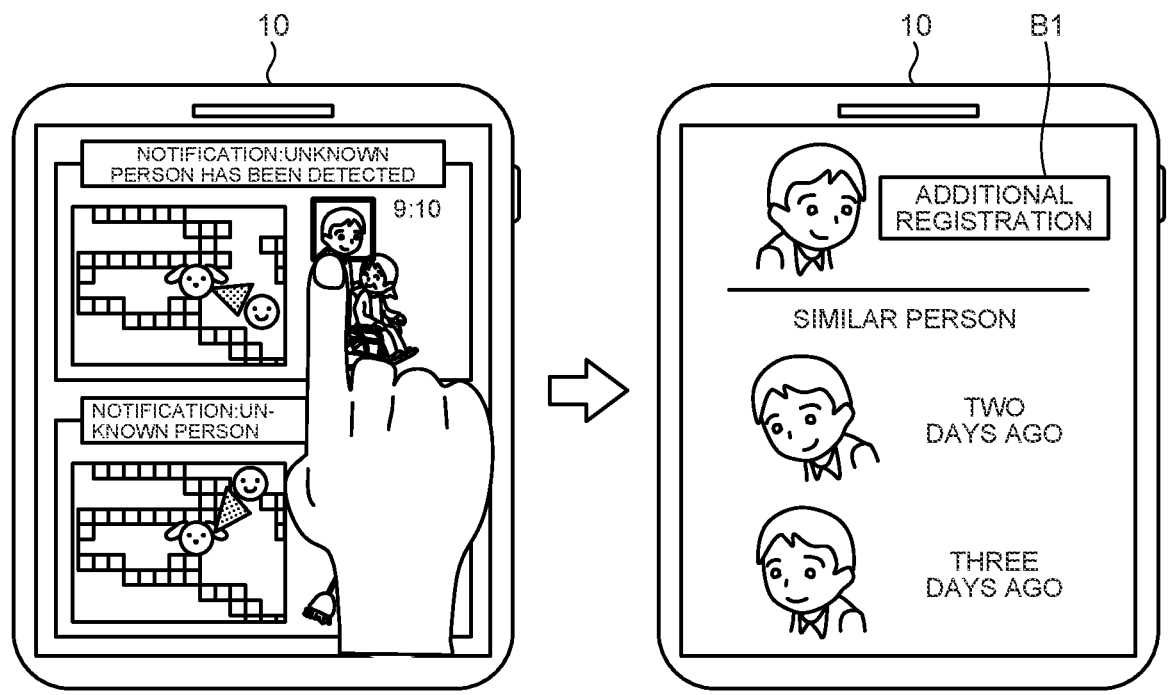
FIG. 5 is a diagram illustrating an example of operation of registering the person dictionary information according to the embodiment.
FIG. 6 is a diagram illustrating a specific example of sound dictionary information according to the embodiment.

FIG. 5 is a diagram illustrating an example of operation of registering the person dictionary information 42 according to the embodiment. As illustrated in FIG. 5, for example, the terminal device 10 displays image data or the like of a person detected as a suspicious person by the information processing device 1.

When the user selects the person displayed on the terminal device 10, transition is performed to a permitted user registration screen. The example illustrated in FIG. 5 illustrates a case where information regarding a detection history of the same person detected as a suspicious person by the information processing device 1 and an additional registration button B1 are displayed on the terminal device 10.

The user selects the additional registration button B1 displayed on the terminal device 10, whereby an input screen (not illustrated) for a name and the like is displayed on the terminal device 10, and information regarding a person is input on the input screen.

The terminal device 10 transmits, to the information processing device 1, the information as the feedback information for the notification information, whereby the information processing device 1 updates the person dictionary information 42 on the basis of the feedback information.

As a result, the information processing device 1 can register the feature value of the permitted user in the person dictionary information 42. Furthermore, regarding a person who is originally the permitted user but is not detected as the permitted user, notification as a suspicious person is performed to the terminal device 10. In this case, the user can also perform operation of setting the person displayed on the terminal device 10 as an already registered permitted user, and feedback information for setting the person described above as an existing permitted user is transmitted from the terminal device 10 to the information processing device 1.

Then, the information processing device 1 updates the person dictionary information 42 on the basis of the feedback information. That is, it is also possible to learn the feature value of the permitted user already registered in the person dictionary information 42 at any time. As a result, recognition accuracy of the existing permitted user can be improved.

Returning to the description of FIG. 2, a description will be given of the sound dictionary information 43. The sound dictionary information 43 is an example of the dictionary information, similarly to the person dictionary information 42. In the present embodiment, the sound dictionary information 43 is information regarding a feature value of each sound. FIG. 6 is a diagram illustrating a specific example of the sound dictionary information 43 according to the embodiment. As illustrated in FIG. 6, the sound dictionary information 43 is information in which "daily life sound ID", "feature value", "registration information", and the like are associated with each other.

The information processing device 1 according to the embodiment stores, as the sound dictionary information 43, a daily life sound, that is, the feature value of each sound other than an abnormal sound, not a feature value related to the abnormal sound. This is because there is a wider variety of abnormal sounds than daily life sounds, and it is difficult to comprehensively register all abnormal sounds in advance. Furthermore, since what kind of sound is determined as an abnormal sound varies depending on environment, it is difficult to define the abnormal sound.

In the example illustrated in FIG. 5, the "daily life sound ID" is an identifier for identifying each daily life sound. The "feature value" is a feature value of a sound of a corresponding daily life sound. Note that, in FIG. 6, the feature value is indicated by being abstracted as "D001" or the like, but specific information is assumed to be stored in "D001".

The "registration information" is information regarding a date and time when a daily life sound with a corresponding daily life sound ID is registered. The information processing device 1 can update the sound dictionary information 43 on the basis of the feedback information for the notification information, similarly to the person dictionary information 42.

Note that, here, a case has been described where the sound dictionary information 43 is information regarding a sound other than an abnormal sound; however, the sound dictionary information 43 may include information regarding the abnormal sound. For example, sound data that is determined as an abnormal sound by the feedback information may be registered as an abnormal sound.

Returning to the description of FIG. 2, a description will be given of the image database 44. The image database 44 is a database that stores image data imaged by the camera sensor 23. FIG. 7 is a diagram illustrating a specific example of the image database 44 according to the embodiment.

As illustrated in FIG. 7, the image database 44 stores "image data", "imaging time", "imaging position", "imaging direction", "feature value", "person ID", and the like in association with each other. The "image data" is an image data body. The "imaging time" indicates an imaging time of the image data. The "imaging direction" indicates a direction of the camera sensor 23 when corresponding image data is imaged.

The "feature value" indicates a feature value of a person reflected in the image data. The "person ID" indicates a person ID of the person reflected in the image data. In the example of FIG. 7, a person ID of an image ID "E002" being unregistered indicates that a person not registered in the person dictionary information 42 is reflected in the image data.

Returning to the description of FIG. 2, a description will be given of the sound database 45. The sound database 45 is a database that stores sound data collected by the microphone sensor 22. FIG. 8 is a diagram illustrating a specific example of the sound database 45 according to the embodiment. As illustrated in FIG. 8, the sound database 45 stores "sound data", "recording point", "sound source", "feature value", "daily life sound ID", and the like in association with each other.

The "sound data" is a sound data body. "Recording time" indicates a time when corresponding sound data is recorded, and the "recording point" indicates a position where corresponding sound data is recorded. The "sound source" indicates a position of a sound source of corresponding sound data.

The "feature value" indicates a feature value extracted from sound data, and the "daily life sound ID" indicates a daily life sound ID of a daily life sound that matches corresponding sound data. In the example illustrated in FIG. 7, it is indicated that a daily life sound ID is not given to sound data "E002" and does not match a daily life sound registered in the sound dictionary information 43.

Returning to the description of FIG. 2, a description will be given of the threshold information 46. The threshold information 46 is information regarding a threshold for a degree of similarity between a feature value registered in the person dictionary information 42 or the sound dictionary information 43 and a feature value of image data or sound data. In the present embodiment, a plurality of thresholds is stored as the threshold information 46 for each of the image data and the sound data.

Figures 9, 10:
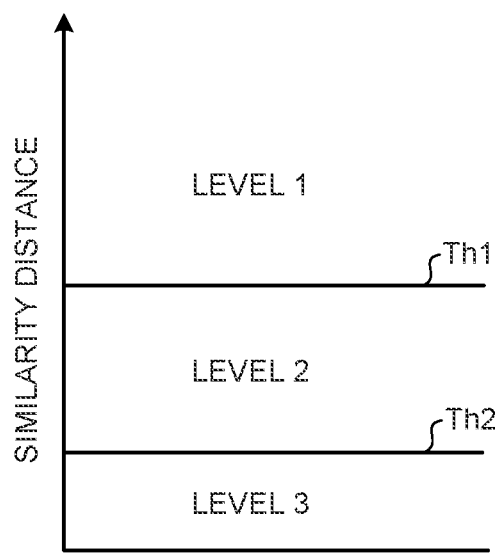
FIG. 9 is a schematic diagram of a threshold for a degree of similarity according to the embodiment.
FIG. 10 is a diagram illustrating a specific example of condition information indicating a transmission condition according to the embodiment.

FIG. 9 is a schematic diagram of a threshold for the degree of similarity according to the embodiment. As will be described later, the information processing device 1 calculates a similarity distance between a feature value of sound data or image data and a feature value (hereinafter, described as a model feature value) registered in the person dictionary information 42 or the sound dictionary information 43. Note that, the smaller the similarity distance, the higher the degree of similarity between both pieces of data.

Here, the threshold information 46 is information regarding the plurality of thresholds. The example illustrated in FIG. 9 illustrates a case where the threshold information 46 is information regarding a first threshold Th1 and a second threshold Th2 having a value smaller than the first threshold Th1.

Furthermore, as illustrated in FIG. 9, the similarity distance is classified into levels on the basis of the first threshold Th1 and the second threshold Th2. In the example illustrated in FIG. 9, in a case where the similarity distance exceeds the first threshold Th1, that is, in a case where the degree of similarity is lower than the first threshold Th1, the level becomes a level 1, and in a case where the similarity distance is less than the first threshold Th1 and exceeds the second threshold Th2, the level becomes a level 2. Furthermore, in a case where the similarity distance is less than the second threshold Th2, the level becomes the level 1.

The information processing device 1 can transmit information regarding the level described above (hereinafter, level information) by include the information in notification information, and this point will be described later. Note that, here, a case has been described where the threshold information 46 is information regarding two thresholds of the first threshold Th1 and the second threshold Th2; however, the number of thresholds may be one or three or more. Furthermore, different thresholds may be provided for the sound data and the image data.

Returning to the description of FIG. 2, a description will be given of the condition information 47. The condition information 47 is information regarding a transmission condition for performing notification of the notification information. The information processing device 1 can suppress notification of unnecessary notification information that does not meet the transmission condition by transmitting only notification information that satisfies the transmission condition of the condition information 47 to the terminal device 10.

FIG. 10 is a diagram illustrating a specific example of the condition information 47 indicating the transmission condition according to the embodiment. As illustrated in FIG. 10, the condition information 47 is information in which "condition ID", "data type", "transmission condition", and the like are associated with each other.

The "condition ID" is an identifier for identifying the transmission condition. The "data type" indicates a type (image data or sound data) of data in which an abnormality is detected. The "transmission condition" indicates a condition for performing notification when an abnormality is detected. That is, notification of the notification information is performed only in a case where the transmission condition is met.

Furthermore, conditions such as "time" and "position" are included as transmission conditions. In the example of FIG. 10, for a condition ID "E001", the data type is image data, and the transmission condition is a time "9:00 to 15:00".

The condition ID "E001" indicates that the notification information is transmitted to the terminal device 10 in a case where a person recognized from image data imaged during 9:00 to 15:00 is not registered in the person dictionary information 42, that is, in a case where a suspicious person other than the permitted user is detected.

That is, the user can suppress transmission of unnecessary notification information from the information processing device 1 by setting a time when the user oneself or a family member is absent as a transmission condition. Note that, the information processing device 1 may learn a time when the user oneself or a family member is absent, and set a transmission condition regarding the time on the basis of a learning result.

Furthermore, for a condition ID "E002" illustrated in FIG. 10, the data type is sound data, and the transmission condition is a position "other than F004". The condition ID "E002" indicates that the notification information is not transmitted to the terminal device 10 in a case where a generation source of an abnormal sound is a point of "F004", and the notification information is transmitted to the terminal device 10 in a case where the generation source is a point other than "F004".

Figure 11:
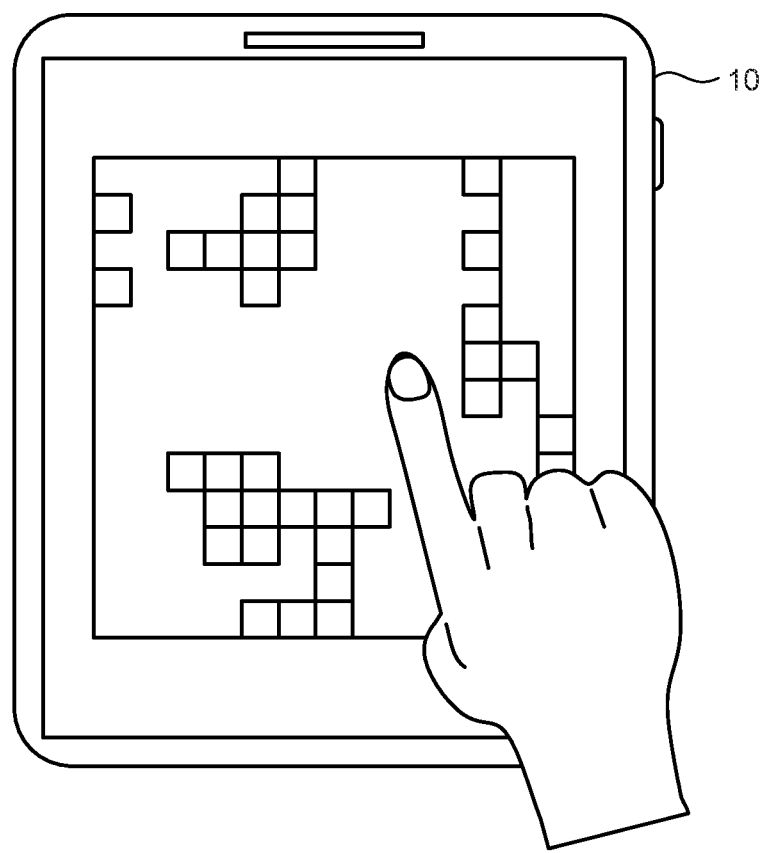
FIG. 11 is a diagram illustrating a specific example of user operation at the time of updating the transmission condition according to the embodiment.

Here, the information processing device 1 can update the condition information 47 on the basis of user operation on the terminal device 10. FIG. 11 is a diagram illustrating a specific example of the user operation at the time of updating the transmission condition according to the embodiment.

Here, as an example, a case will be described where, in the condition information 47, a "position" of the condition ID "E002" illustrated in FIG. 11, that is, a permitted position is registered. As illustrated in FIG. 11, the terminal device 10 displays a map based on the map information 41 as a transmission condition setting screen.

Then, the user can designate the "position" described above by selecting a position of a sound generation source such as a television or a speaker from the map displayed on the terminal device 10. That is, in this case, the terminal device 10 is not notified of a sound generated from the television or the speaker as the abnormal sound.

Note that, in the example illustrated in FIG. 10, the description has been made assuming that the data type is image data or sound data; however, it is also possible to set the data type in more detail. For example, it is also possible to set the transmission condition for each permitted user or each daily life sound. Specifically, the transmission condition can be set so that the notification information is transmitted in a case where it is detected that a specific permitted user (for example, the home helper described above) has entered an area other than the designated area.

Furthermore, the information processing device 1 may analyze behavior of the permitted user from the image data, and set the transmission condition to transmit the notification information in a case where the permitted user takes a predetermined behavior.

Furthermore, for example, it is also possible to set the transmission condition to transmit the notification information in a case where it is detected that a specific daily life sound (for example, a sound of water) has occurred in an area other than a designated place (wet area).

Returning to the description of FIG. 2, a description will be given of the control unit 5. The control unit 5 has a function of controlling each component included in the information processing device 1. Furthermore, as illustrated in FIG. 2, the control unit 5 includes a map generation unit 51, a sound detection unit 52, a sound source estimation unit 53, a person detection unit 54, a determination unit 55, a notification information generation unit 56, and an update unit 57.

The map generation unit 51 creates a map of a predetermined area (in the house H) on the basis of the depth information detected by the depth sensor 21, and stores the map in the storage unit 4 as the map information 41. The map generation unit 51 can generate the map information 41 by simulation localization and mapping (SLAM).

Note that, the map generation unit 51 may update the map information 41 at a predetermined cycle on the assumption that rearrangement or the like of furniture in the house H is performed, or may generate every time the map at the time of going around. Furthermore, the information processing device 1 may store a map generated by another device as the map information 41.

The sound detection unit 52 is an example of a detection unit, and detects occurrence of an abnormal sound as an event. Specifically, the sound detection unit 52 extracts a feature value of sound data input from the microphone sensor 22, and performs matching with model feature values registered in the sound dictionary information 43 in a brute-force manner.

The sound detection unit 52 calculates a Euclidean distance between feature values as a similarity distance, and determines that both compared sound data match in a case where the similarity distance exceeds a predetermined threshold (for example, the second threshold Th2 indicated in FIG. 9).

As described above, the sound dictionary information 43 is information regarding features of daily life sounds, in other words, sounds other than abnormal sounds. Thus, the sound detection unit 52 detects the sound data as an abnormal sound in a case where the feature value of the sound data does not match any of the model feature values registered in the sound dictionary information 43. That is, in a case where the sound data is other than the abnormal sound, the sound detection unit 52 detects the sound data as a permitted sound.

Furthermore, the sound detection unit 52 determines the level on the basis of the smallest similarity distance among the compared feature values. That is, the sound detection unit 52 determines the level as the level 1 in a case where the smallest similarity distance exceeds the first threshold Th1, determines the level as the level 2 in a case where the smallest similarity distance is from the first threshold Th1 to the second threshold Th2, and determines the level as a level 3 in a case where the smallest similarity distance is less than the second threshold Th2.

Then, the sound detection unit 52 registers information regarding the sound data in which the abnormal sound is detected in the sound database 45. Note that, in a case where the sound detection unit 52 detects sound data related to daily life sounds, the sound data can also be registered in the sound database 45.

The sound source estimation unit 53 estimates a generation source of the abnormal sound detected by the sound detection unit 52, that is, a position of a sound source. Specifically, the sound source estimation unit 53 estimates an orientation in which the abnormal sound is generated, by using various azimuth calculation algorithms such as a multiple signal classification (MUSIC) method or the like for the sound data, for example. Then, the position of the sound source is estimated on the basis of a current location and a direction of the information processing device 1 and the estimated orientation. Upon estimating the sound source, the sound source estimation unit 53 writes position information of the estimated sound source in a field of the sound source of the corresponding sound data in the sound database 45.

The person detection unit 54 is an example of the detection unit, and detects entry of a suspicious person as an event. Specifically, the person detection unit 54 detects the face of a person reflected in an image data from the image data, and extracts a feature value (hereinafter, described as an image feature value) of the detected face. Next, the person detection unit 54 performs matching between the image feature value and model feature values of the face of the permitted users in the person dictionary information 42 in a brute-force manner.

The person detection unit 54 performs the matching by calculating a Euclidean distance between the image feature value and the model feature value as a degree-of-similarity distance. The person detection unit 54 detects the person reflected in the image data and a permitted user as the same person if the degree-of-similarity distance is less than a predetermined threshold, and detects the person reflected in the image data as a person other than the permitted user if the degree-of-similarity distance is greater than or equal to the threshold.

That is, in a case where the person reflected in the image data does not match any permitted user, the person detection unit 54 detects the person as a suspicious person. Then, in a case where the suspicious person is detected, the person detection unit 54 specifies a position of the suspicious person on the basis of an imaging position of the image data, an imaging direction of the camera sensor 23 at the time of imaging the image data, and the like, and writes a feature value and the like of the suspicious person in the image database 44. Furthermore, the person detection unit 54 can also determine the level on the basis of the similarity distance similarly to the sound detection unit 52.

In a case where an abnormality such as an abnormal sound or a suspicious person is detected by the sound detection unit 52 or the person detection unit 54, the determination unit 55 determines whether or not the abnormality meets a transmission condition of the condition information 47. Specifically, the determination unit 55 refers to the condition information 47 and determines whether or not an occurrence time, an occurrence position, and the like of the abnormality meet transmission conditions.

In the example illustrated in FIG. 10, the determination unit 55 determines that the transmission condition is met in a case where the generation source of the abnormal sound is other than the point of "F004" that is a permitted point, or in a case where a detection time of the suspicious person is other than a permitted time "9:00 to 15:00". That is, the determination unit 55 determines that the transmission condition is not met in a case where the generation source of the abnormal sound is the permitted point or in a case where the detection time of the suspicious person is the permitted time.

The notification information generation unit 56 generates notification information regarding the abnormality determined to meet the transmission condition by the determination unit 55. Specifically, the notification information generation unit 56 generates the notification information by extracting data regarding the abnormality determined to meet the transmission condition from the image database 44 or the sound database 45.

Here, notification information regarding the suspicious person includes information such as image data of the suspicious person, and an imaging time, an imaging position, and an imaging direction of the image data. Furthermore, notification information regarding the abnormal sound includes information such as sound data of the abnormal sound, a recording time, a recording point, and a sound source.

Figure 12A:
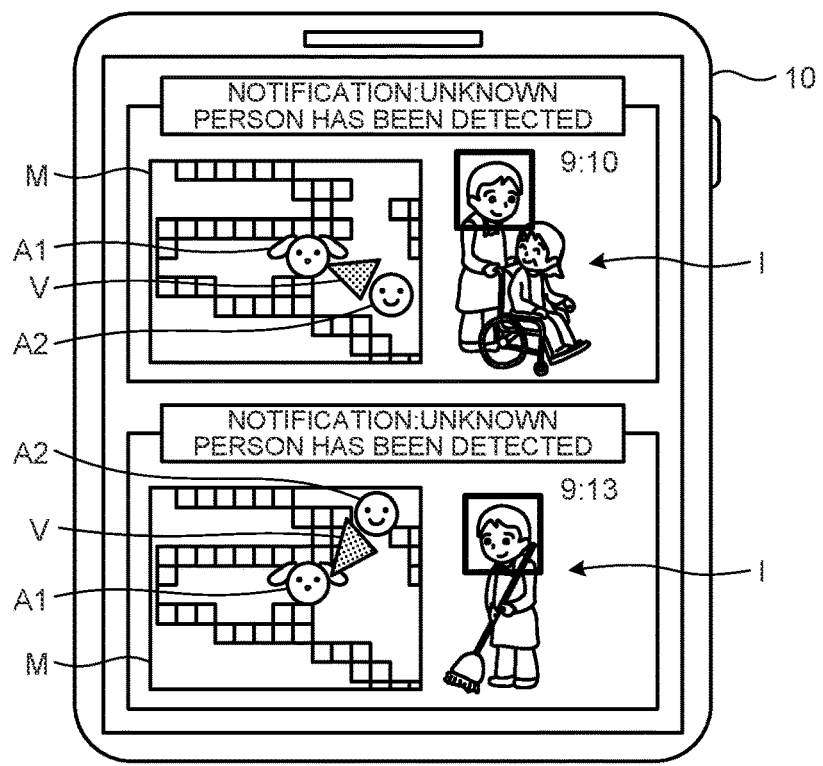
FIG. 12A is a diagram (1) illustrating a specific example of notification information displayed on a terminal device.

FIGS. 12A to 12D are diagrams illustrating specific examples of the notification information displayed on the terminal device 10. First, with reference to FIG. 12A, a description will be given of a specific example of the notification information regarding the suspicious person. As illustrated in FIG. 12A, the terminal device 10 displays, as the notification information, a map M and image data I in addition to information regarding a type of the abnormality and an occurrence time of the abnormality.

Furthermore, the map M displays a position icon A1 indicating the imaging position of the image data I, a suspicious person icon A2 indicating the position of the suspicious person, and the direction of the camera sensor 23 when the suspicious person is imaged, that is, an angle of view V.

Furthermore, in the image data I, a marker surrounding the face of a person recognized as the suspicious person is displayed. The notification information generation unit 56 extracts data necessary for the notification information from the map information 41 and the image database 44, and generates the notification information. Note that, the notification information generation unit 56 may generate an image of the notification information displayed on the terminal device 10 and transmit the image to the terminal device 10, or the image may be generated on the terminal device 10 side.

Furthermore, the notification information generation unit 56 can collect a plurality of pieces of notification information based on the same rule information. Here, based on the same rule information indicates, for example, that the same suspicious person has been detected. Note that, determination whether or not two persons are the same suspicious person is performed by calculating a similarity distance between feature values and determining whether or not the calculated similarity distance is less than a threshold (for example, the second threshold Th2).

Then, the notification information generation unit 56 generates one piece of notification information by collecting a plurality of pieces of notification information in which the two are determined to be the same suspicious person. In this case, in addition to the position icon A1 and the angle of view V, a plurality of pieces of image data I including the face of the suspicious person, and the detection time T at which the suspicious person is detected are each displayed on one map M on the terminal device 10.

By collecting the notification information in this way, the user can confirm the suspicious person with less notification information as compared with a case of checking each piece of notification information, and thus, it is possible to reduce a burden on the user for checking.

Figure 12B:
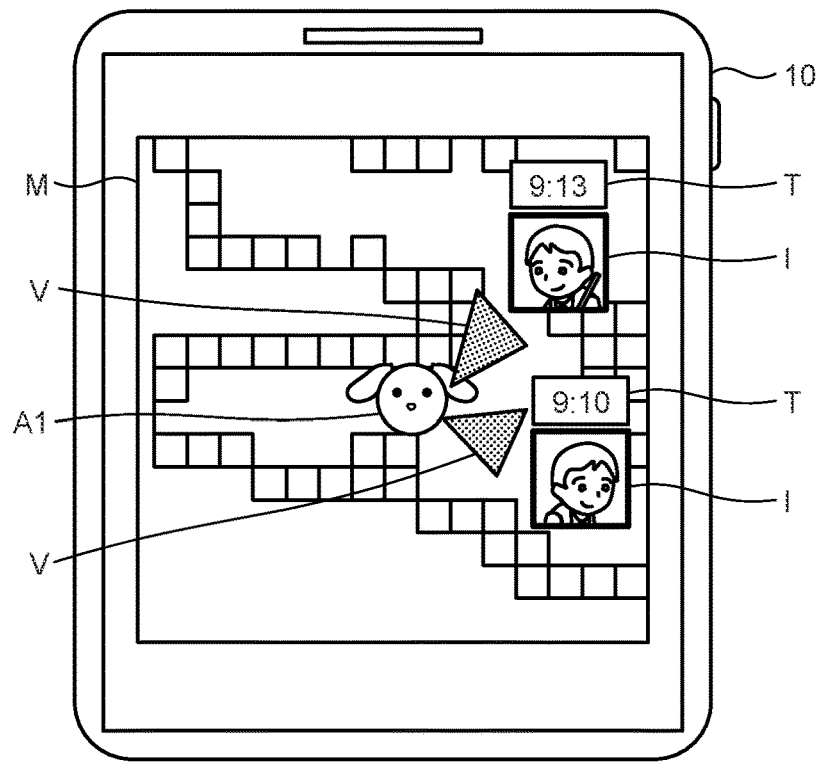
FIG. 12B is a diagram (2) illustrating a specific example of the notification information displayed on the terminal device.

In this case, for example, the notification information generation unit 56 may newly generate the notification information illustrated in FIG. 12B for each detection of the same suspicious person, or may generate the notification information individually for each detection of the suspicious person to integrate the notification information on the terminal device 10 side.

Figure 12C:
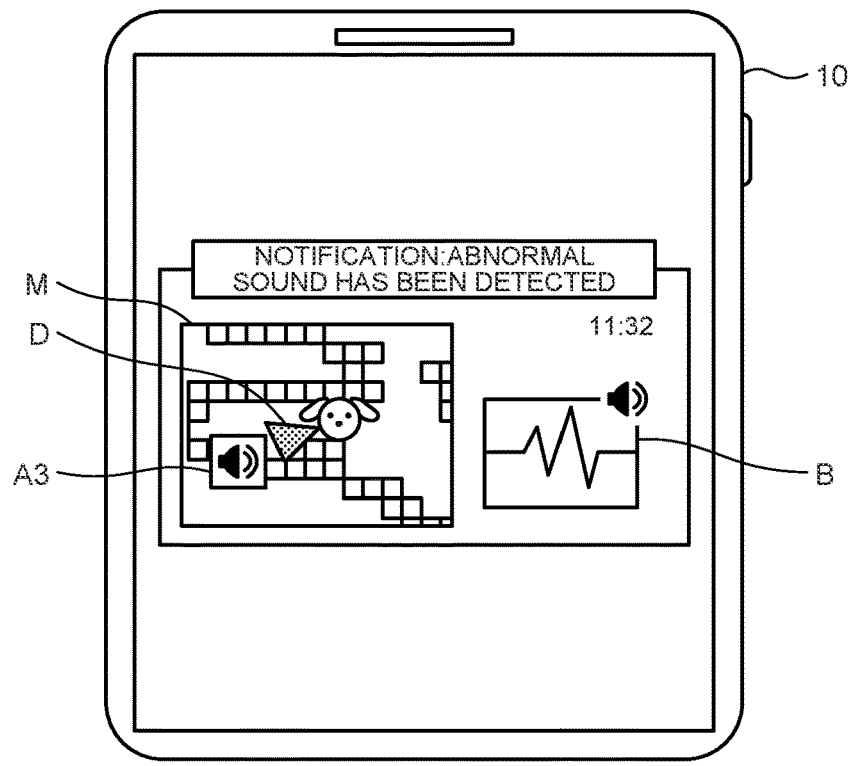
FIG. 12C is a diagram (3) illustrating a specific example of the notification information displayed on the terminal device.

Next, with reference to FIG. 12C, a description will be given of a specific example of the notification information regarding the abnormal sound. As illustrated in FIG. 12C, a reproduction button B is displayed on the terminal device 10 together with the map M. Furthermore, as illustrated in FIG. 12C, a direction icon D indicating a direction of the information processing device 1 and a sound source icon A3 indicating a position of the sound source are displayed on the map M together with the position icon A1.

The user selects the reproduction button B, whereby sound data detected as the abnormal sound is reproduced by the terminal device 10. As a result, the user can confirm the abnormal sound. Then, feedback information for the notification information is generated by the terminal device 10 on the basis of operation by the user as to whether or not the confirmed sound is an abnormal sound, and the generated feedback information is transmitted to the information processing device 1.

Note that, the notification information of the abnormal sound may include image data obtained by imaging the sound source in addition to the sound source icon A3. As a result, the user can easily grasp a situation when the abnormal sound occurs.

Furthermore, the notification information generation unit 56 includes the level information regarding the level illustrated in FIG. 9 in the notification information, whereby the terminal device 10 can collectively display pieces of notification information for each level.

Figure 12D:
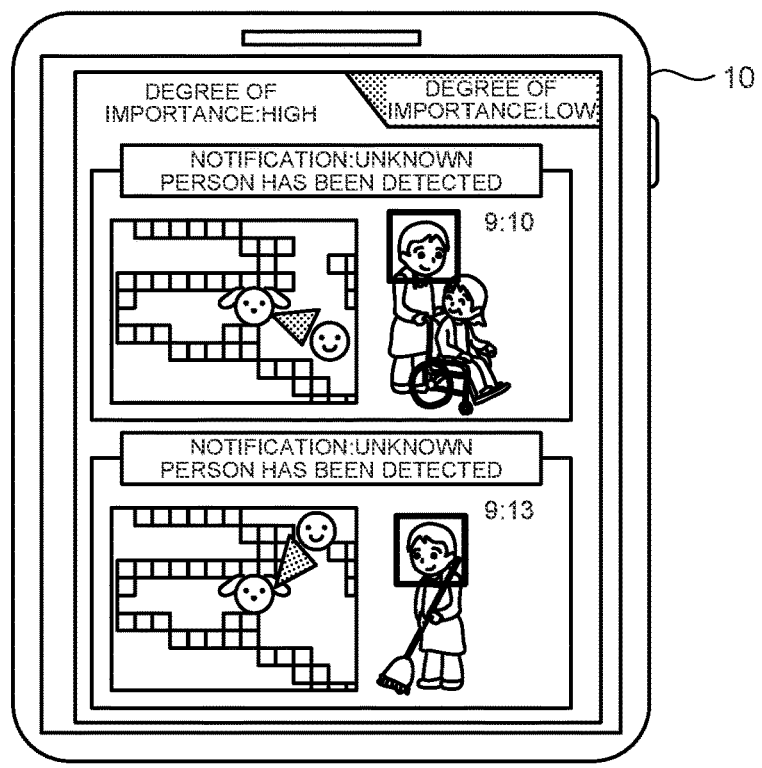
FIG. 12D is a diagram (4) illustrating a specific example of the notification information displayed on the terminal device.

For example, as illustrated in FIG. 12D, the terminal device 10 displays a plurality of tabs depending on the levels, and displays the notification information for each tab. In the example illustrated in FIG. 12D, a case is illustrated where a degree of importance is associated with the tab for each level.

Specifically, notification information at the level 1 is displayed in a tab with the degree of importance level of "high", and notification information at the level 2 is displayed in a tab with the degree of importance level of "low". In the example illustrated in FIG. 9, the lower the level, the higher the similarity distance, and thus, it is indicated that the lower the level, the larger a deviation from the feature value registered in the person dictionary information 42 or the sound dictionary information 43.

Thus, it is indicated that the lower the level, the more the person or the abnormal sound deviates from the permitted user or the daily life sound. That is, in the case of the level 1, since a possibility of the suspicious person or the abnormal sound is high, the degree of importance level is displayed as "high", and in the case of the level 2, since the possibility of the suspicious person or the abnormal sound is lower than that of the level 1, the degree of importance level is displayed as "low".

Then, the notification information is collectively displayed for each degree of importance level on the terminal device 10, whereby the user can preferentially confirm the notification information with a high degree of importance. As a result, confirmation of the notification information by the user can be facilitated. Note that, the terminal device 10 may change a method of notifying the user depending on the level of the notification information. For example, the terminal device 10 can perform push notification only in a case where the notification information of the level 1 is received and perform pull notification in a case where the notification information of the level 2 is received.

Returning to the description of FIG. 2, a description will be given of the update unit 57. The update unit 57 updates the rule information on the basis of the feedback information for the notification information. Specifically, the update unit 57 updates the person dictionary information 42, the sound dictionary information 43, and the condition information 47 on the basis of the feedback information. Here, the person dictionary information 42, the sound dictionary information 43, and the condition information 47 are examples of the rule information, and the person dictionary information 42 and the sound dictionary information 43 correspond to examples of the dictionary information. Furthermore, the rule information may include the threshold information 46.

First, a description will be given of a case where the update unit 57 updates the dictionary information. The update unit 57 registers a new permitted user or a new daily life sound in the person dictionary information 42 or the sound dictionary information 43 on the basis of the feedback information. Here, the feedback information includes information on whether or not a person detected as a suspicious person is actually a suspicious person, and information on whether or not a sound detected as an abnormal sound is actually an abnormal sound. That is, the feedback information includes correctness information regarding correctness of the abnormality indicated by the notification information.

For this reason, on the basis of the correctness information, the update unit 57 can register a person detected as a suspicious person as a permitted user in the person dictionary information 42, and can register a sound detected as an abnormal sound as a daily life sound in the sound dictionary information 43.

Furthermore, the update unit 57 can not only register new data in the person dictionary information 42 and the sound dictionary information 43 but also delete arbitrary data. Hereinafter, a case will be described where data is deleted from the sound dictionary information 43, but the same applies to the person dictionary information 42.

Figure 13:
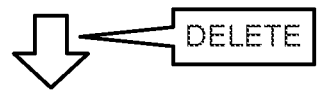
FIG. 13 is a schematic diagram illustrating an example of information processing according to the embodiment.

FIG. 13 is a schematic diagram illustrating deletion of data of the dictionary information according to the embodiment. As illustrated in FIG. 13, the update unit 57 deletes a daily life sound that has not been detected for a predetermined period (for example, one month).

Here, "delete" may be actual deletion, or indicates deletion from a feature value comparison target without actual deletion. For example, a case is assumed where a sound due to construction is registered as a daily life sound. In this case, in a case where the construction is finished, there may be a case where the sound becomes an abnormal sound instead of a daily life sound. Similarly, although a construction related person is once set as a permitted user, the construction related person may become a suspicious person when the construction is ended.

That is, the update unit 57 can appropriately detect an abnormality in accordance with the current environment by deleting a sound that has not been detected for a predetermined period. Note that, not limited to the examples described above, input of a period for which registration as the permitted user or the daily life sound is performed may be received from the user at the time of registration of the permitted user or the daily life sound.

Note that, here, a case has been described where the update unit 57 deletes the dictionary information; however, the update unit 57 can also delete the transmission condition of the condition information 47. That is, an old transmission condition is deleted, whereby it is possible to newly set a transmission condition according to the user's current situation.

Next, a description will be given of processing in which the update unit 57 updates the condition information 47 in the rule information. The update unit 57 updates the condition information 47 on the basis of the transmission condition designated by the user or the feedback information.

Specifically, in a case where the update unit 57 updates the condition information 47 on the basis of the transmission condition designated by the user, the user can set the transmission condition in which the data type, the time, and the position are combined, as illustrated in FIG. 10.

Meanwhile, even in the case of the same sound, if the occurrence time and the position of the sound source vary, both cases are conceivable, a case of the actual daily life sound and a case of the abnormal sound. For this reason, the update unit 57 can update the transmission conditions such as the time and the position for each abnormal sound on the basis of the feedback information.

For example, a case is assumed where feedback information is received indicating that sound data transmitted as an abnormal sound is not an abnormal sound. In this case, the update unit 57 updates the transmission condition so that notification information regarding the sound data is not transmitted only under a condition in which the occurrence time and the position are limited.

Then, the update unit 57 can optimize the transmission condition for sound data having the same content by sequentially repeating the processing described above. Note that, the sound data having the same content indicates that the similarity distance of the feature value is less than or equal to a predetermined value.

Furthermore, the update unit 57 can add conditions such as a day of the week and weather to each sound data. Specifically, the transmission condition can be set so that the notification information is transmitted on a weekday and the notification information is not transmitted on a holiday, or the transmission condition can be updated so that the notification information is transmitted on a sunny day and the notification information is not transmitted on a rainy day.

Furthermore, the update unit 57 may update the transmission condition on the basis of a situation when an abnormality is detected. Specifically, the update unit 57 may add, to the transmission condition, presence or absence of a permitted user existing around when the abnormality is detected, or the like.

Furthermore, the update unit 57 may update the threshold for the similarity distance on the basis of the feedback information. For example, the update unit 57 can learn each of a feature value of data determined not to be abnormal by the feedback information and a feature value of data determined to be abnormal, and update the threshold on the basis of a learning result. That is, detection accuracy of the abnormality can be improved by optimizing the threshold for the similarity distance.

Figure 14:
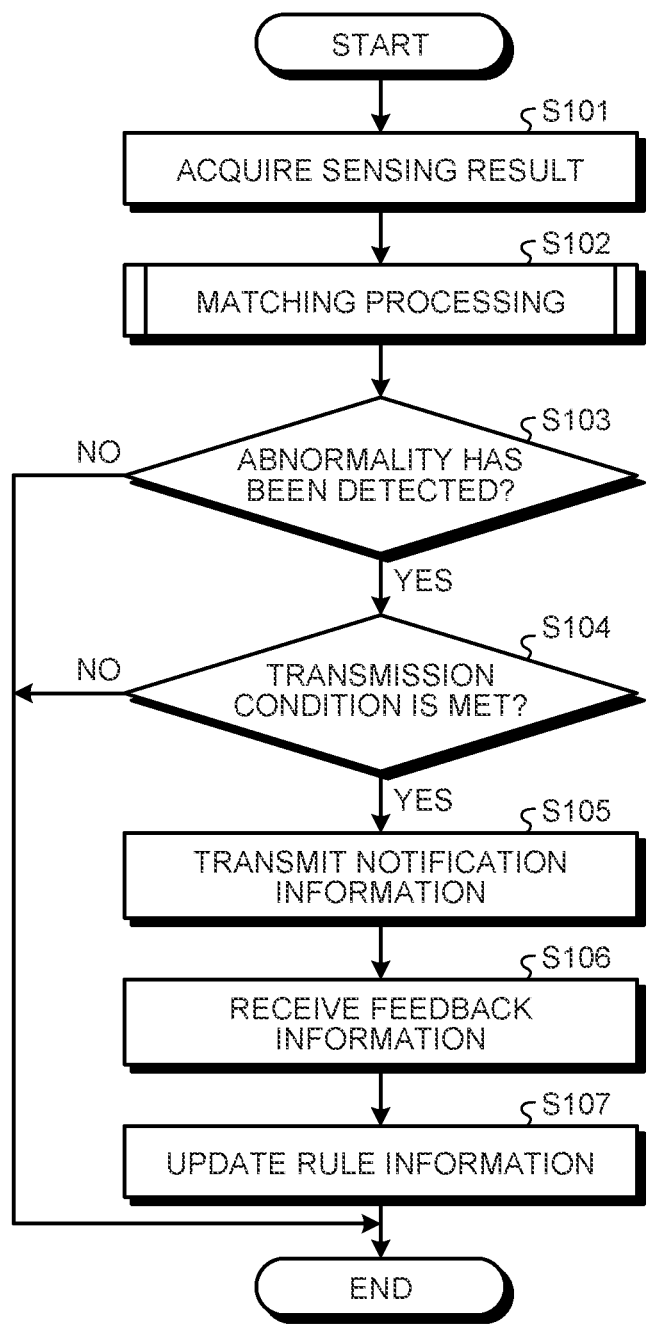
FIG. 14 is a flowchart illustrating a processing procedure executed by the information processing device according to the embodiment.

Next, with reference to FIG. 14, a description will be given of a processing procedure executed by the information processing device 1 according to the embodiment. FIG. 14 is a flowchart illustrating the processing procedure executed by the information processing device 1 according to the embodiment.

As illustrated in FIG. 14, when acquiring a sensing result (step S101), the information processing device 1 performs matching processing between a feature value in the sensing result and a feature value registered in the dictionary information (step S102). Note that, a processing procedure of step S102 will be described later with reference to FIG. 15.

Subsequently, the information processing device 1 determines whether or not an abnormality has been detected as a result of the matching processing of step S102 (step S103), and ends processing for the sensing result in a case where no abnormality has been detected (step S103, No).

Furthermore, in a case where it is determined that an abnormality has been detected in the determination of step S103 (step S103, Yes), the information processing device 1 determines whether or not the detected abnormality meets the transmission condition (step S104).

Subsequently, in a case where it is determined that the transmission condition is not met in the determination processing of step S104 (step S104, No), the information processing device 1 ends processing related to the abnormality. Furthermore, in a case where it is determined that the transmission condition is met in the determination processing of step S104 (step S104, Yes), the information processing device 1 transmits notification information regarding the abnormality to the terminal device 10 (step S105).

Thereafter, the information processing device 1 receives feedback information from the terminal device 10 (step S106), updates rule information on the basis of the feedback information (step S107), and ends the processing.

Figure 15:
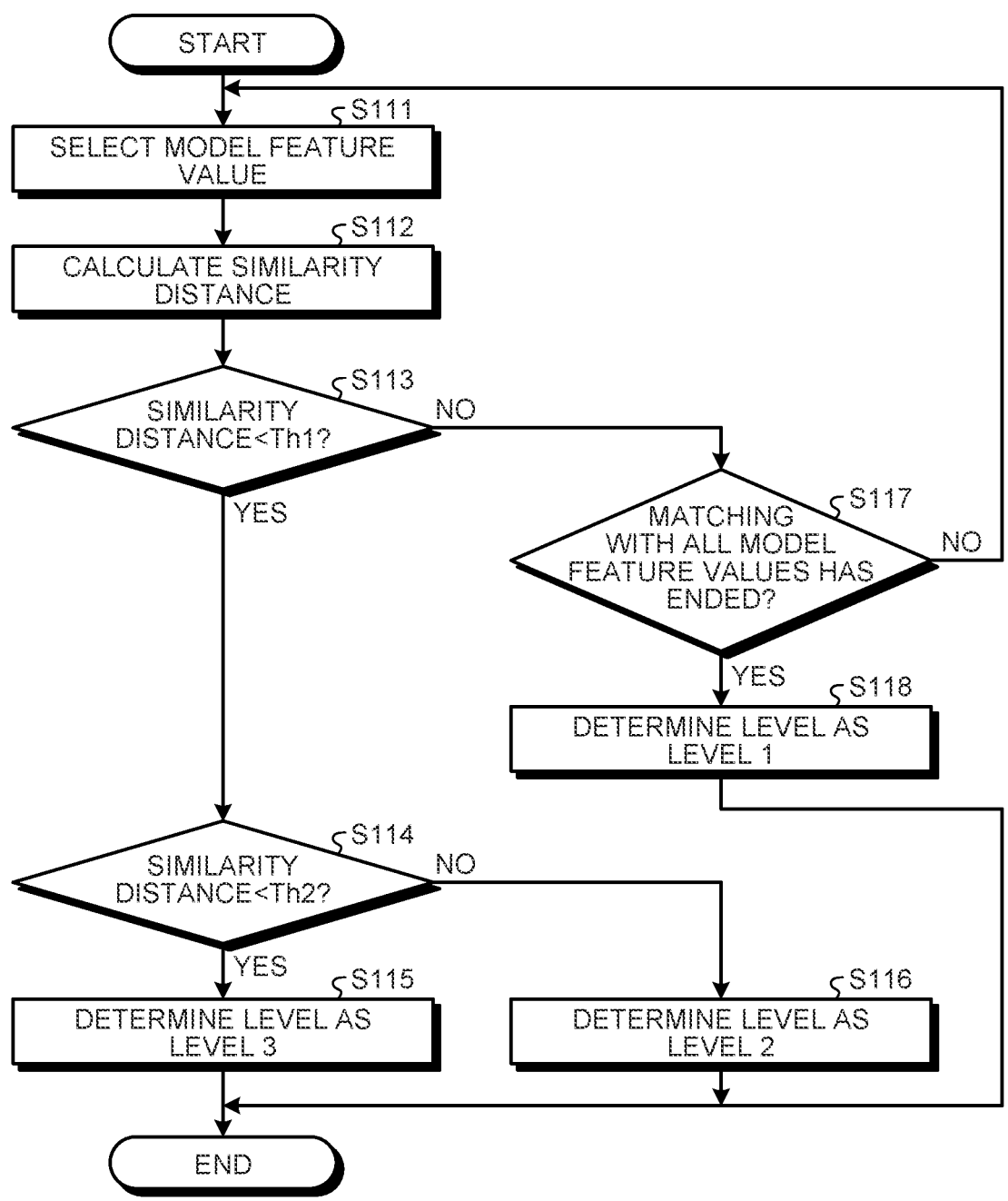
FIG. 15 is a flowchart illustrating a processing procedure of matching processing illustrated in step S102 of FIG. 14.

Next, with reference to FIG. 15, a description will be given of the processing procedure of the matching processing illustrated in step S102 of FIG. 14. FIG. 15 is a flowchart illustrating the processing procedure of the matching processing illustrated in step S102 of FIG. 14.

As illustrated in FIG. 15, the information processing device 1 selects a model feature value registered in the dictionary information (step S111), and calculates a similarity distance between a feature value of the sensing result and the model feature value (step S112).

Subsequently, the information processing device 1 determines whether or not the similarity distance calculated in step S112 is smaller than the first threshold Th1 (step S113), and in a case where the similarity distance is smaller than the first threshold Th1 (step S113, Yes), determines whether or not the similarity distance is smaller than the second threshold Th2 (step S114).

In a case where the similarity distance is smaller than the second threshold Th2 in the determination processing of step S114 (step S114, Yes), the information processing device 1 determines the level as the level 3 (step S115), and ends the processing.

Furthermore, in a case where the similarity distance is greater than or equal to the second threshold in the determination processing of step S114 (step S114, No), the information processing device 1 determines the level as the level 2 (step S116), and ends the processing.

Furthermore, in a case where the similarity distance is greater than or equal to the first threshold Th1 in the determination processing of step S113 (step S113, No), the information processing device 1 determines whether or not matching with all the model feature values has ended (step S117).

Then, in a case where there is a model feature value for which matching has not been performed (step S117, No), the information processing device 1 proceeds to processing of step S111, and in a case where matching with all the model feature values has ended (step S117, Yes), the information processing device 1 determines the level as the level 1 (step S118), and ends the processing.

Note that, for example, in consideration of a case where the similarity distances to a plurality of model feature values is less than or equal to the first threshold Th1 or the second threshold Th2, the similarity distances to all the model feature values may be calculated, and then classification into levels may be performed at the minimum similarity distance.

[Outline of Modification]

Meanwhile, in the above-described embodiment, a case has been described where the information processing device 1 is arranged in a predetermined area (house H); however, the present invention is not limited thereto. For example, the information processing device 1 can be configured as a server device.

Figure 16:
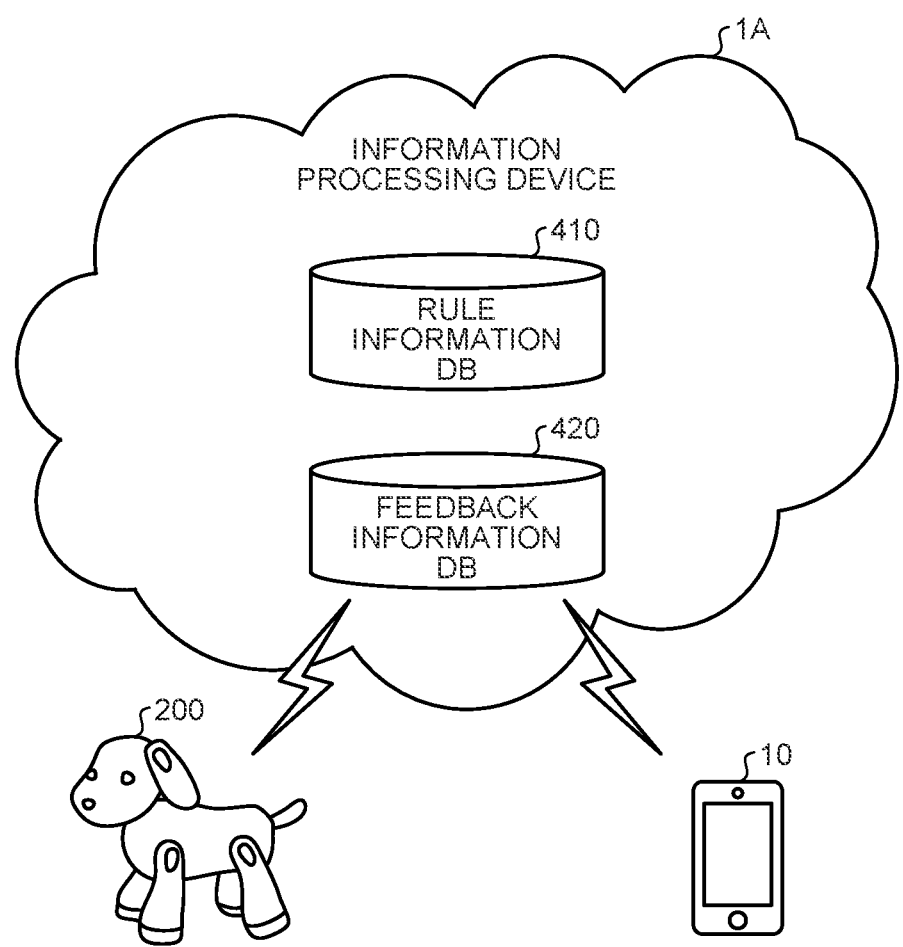
FIG. 16 is a schematic diagram of an information processing device according to a modification.
Figure 17:
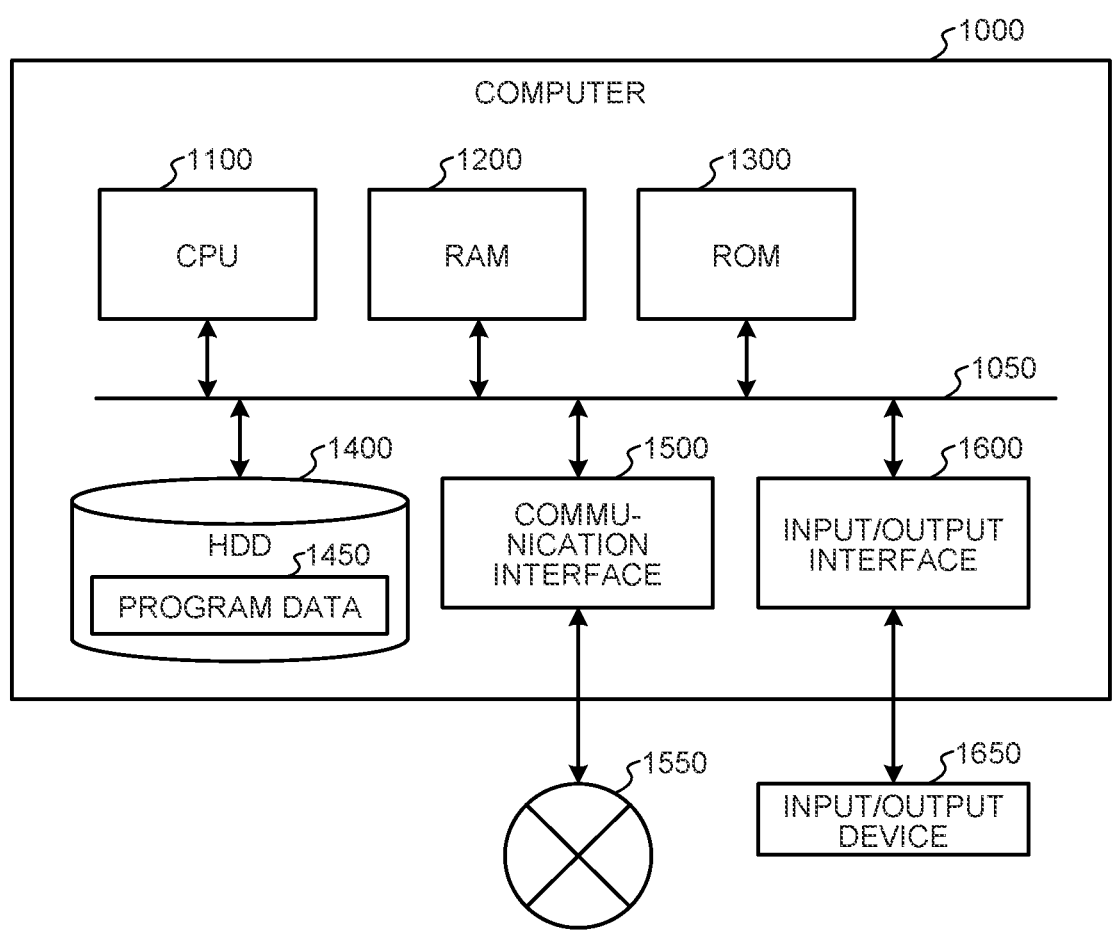
FIG. 17 is a hardware configuration diagram illustrating an example of a computer that implements functions of the information processing device.

FIG. 16 is a schematic diagram of an information processing device 1A according to a modification. Note that, FIG. 16 illustrates the information processing device 1A in a simplified manner. As illustrated in FIG. 16, the information processing device 1A according to the modification is a server device, and includes a rule information DB 410 and a feedback information DB 420.

For example, the information processing device 1A receives a sensing result of environment information transmitted from a pet-type robot 200, and determines whether or not to transmit notification information to the terminal device 10 on the basis of dictionary information and a transmission condition registered in the rule information DB 410.

In a case where it is determined that the transmission condition is met, the information processing device 1A transmits the notification information to the terminal device 10, and then receives feedback information for the notification information. Then, the information processing device 1A stores the feedback information in the feedback information DB 420, and updates the rule information registered in the rule information DB on the basis of the feedback information.

Note that, here, a case has been described where the information processing device 1A receives the sensing result from the pet-type robot 200; however, the present invention is not limited thereto. That is, the dictionary information may be built in the pet-type robot 200, detection of a suspicious person and detection of an abnormal sound may be performed on the pet-type robot 200 side, and determination whether or not the transmission condition is satisfied may be performed on the information processing device 1A side.

[Other Modifications]

Meanwhile, in the above-described embodiment, a description has been made in which the predetermined area is the house H; however, the present invention is not limited thereto, and any area can be set as the predetermined area.

Furthermore, in the above-described embodiment, a case has been described where the information processing device 1 detects an abnormality as an event in the predetermined area; however, the present invention is not limited thereto. That is, what kind of event is detected may be arbitrarily changed depending on a request of the user. Specifically, an event may be arbitrarily set, such as that notification information is transmitted in a case where it is detected that a predetermined user has come home.

Information devices such as the information processing device according to each embodiment described above, an HMD, and a controller are implemented by a computer 1000 having a configuration as illustrated in FIG. 16, for example. Hereinafter, the information processing device 1 according to the embodiment will be described as an example. FIG. 16 is a hardware configuration diagram illustrating an example of the computer 1000 that implements functions of the information processing device 1. The computer 1000 includes a CPU 1100, a RAM 1200, a read only memory (ROM) 1300, a hard disk drive (HDD) 1400, a communication interface 1500, and an input/output interface 1600. Units of the computer 1000 are connected to each other by a bus 1050.

The CPU 1100 operates on the basis of a program stored in the ROM 1300 or the HDD 1400, and controls each unit. For example, the CPU 1100 deploys a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a program according to the present disclosure that is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000 to each other. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 1 according to the embodiment, the CPU 1100 of the computer 1000 implements functions of the map generation unit 51 and the like by executing a program loaded on the RAM 1200. Furthermore, the HDD 1400 stores the program according to the present disclosure and data in the storage unit 4. Note that, the CPU 1100 reads and executes the program data 1450 from the HDD 1400, but as another example, may acquire these programs from another device via the external network 1550.

Note that, the present technology can also have the following configurations.

(1). An information processing device comprising:

a transmission unit that transmits, on a basis of rule information set in advance and a sensing result by a sensor that senses environment information on a predetermined area, notification information based on the sensing result to a terminal device;

a reception unit that receives, from the terminal device, feedback information for the notification information transmitted by the transmission unit; and an update unit that updates the rule information on a basis of the feedback information received by the reception unit.

(2). The information processing device according to (1), further comprising:

a detection unit that detects, on a basis of dictionary information serving as a reference of detecting a predetermined event in the rule information, the event from the sensing result; and a determination unit that determines whether or not the event detected by the detection unit meets condition information indicating a transmission condition for transmitting the notification information in the rule information, wherein the transmission unit transmits the notification information regarding the event determined to meet the transmission condition by the determination unit.

(3). The information processing device according to (2), wherein the detection unit detects an abnormality in the predetermined area as the event.

(4). The information processing device according to (3), wherein the determination unit determines that the transmission condition is met in a case where an occurrence time of the abnormality is not a permitted time at which occurrence of the abnormality is permitted in the transmission condition.

(5). The information processing device according to (3) or (4), wherein the determination unit determines that the transmission condition is met in a case where an occurrence point of the abnormality is not a permitted point at which occurrence of the abnormality is permitted in the transmission condition.

(6). The information processing device according to any one of (3) to (5), wherein the detection unit detects the abnormality in a case where a person reflected in image data that is the sensing result is not a permitted user registered in the dictionary information.

(7). The information processing device according to any one of (3) to (6), wherein the detection unit detects the abnormality in a case where sound data that is the sensing result is not a permitted sound registered in the dictionary information.

(8). The information processing device according to (7), wherein in the dictionary information, a daily life sound is registered as the permitted sound.

(9). The information processing device according to any one of (1) to (8), wherein the update unit deletes information that has not been used for a predetermined period in the rule information.

(10). The information processing device according to any one of (3) to (9), wherein the detection unit determines a level of the abnormality by comparing a degree of similarity between a feature value registered in the dictionary information and a feature value of the sensing result, with a plurality of thresholds, and the transmission unit transmits the notification information to which a degree of importance depending on the level is given.

(11). The information processing device according to (10), wherein the update unit updates the threshold on the basis of the feedback information.

(12). The information processing device according to any one (1) to (11), wherein the transmission unit collectively transmits a plurality of pieces of the notification information based on the rule information identical into one piece of the notification information.

(13). The information processing device according to any one (2) to (12) wherein the reception unit receives, as the feedback information, correctness information regarding correctness of the abnormality indicated by the notification information, and the update unit updates the condition information on a basis of the correctness information.

(14). The information processing device according to (13), wherein the update unit updates the dictionary information on the basis of the correctness information.

(15). The information processing device according to any one of (3) to (14), wherein the transmission unit transmits, as the notification information, information regarding at least one of an occurrence position of the event, an occurrence time of the event, a position where the event has been detected, or the sensing result serving as a basis of the event.

(16). The information processing device according to (15), wherein the transmission unit transmits information regarding an imaging direction in which the image data has been imaged as the notification information in a case where the sensing result in which the event has been detected is image data.

(17). The information processing device according to any one of (1) to (18), wherein the information processing device is a mobile robot.

(18). A method, by a computer, comprising:

transmitting, on a basis of rule information set in advance and a sensing result by a sensor that senses environment information on a predetermined area, notification information based on the sensing result to a terminal device;

receiving, from the terminal device, feedback information for the notification information transmitted; and updating the rule information on a basis of the feedback information received.

(19). A program causing a computer to function as:

a transmission unit that transmits, on a basis of rule information set in advance and a sensing result by a sensor that senses environment information on a predetermined area, notification information based on the sensing result to a terminal device;

a reception unit that receives, from the terminal device, feedback information for the notification information transmitted by the transmission unit; and an update unit that updates the rule information on a basis of the feedback information received by the reception unit.

REFERENCE SIGNS LIST 1, 1A INFORMATION PROCESSING DEVICE
2 SENSOR UNIT
10 TERMINAL DEVICE
21 DEPTH SENSOR (EXAMPLE OF SENSOR)
22 MICROPHONE SENSOR (EXAMPLE OF SENSOR)
23 CAMERA SENSOR (EXAMPLE OF SENSOR)
31 RECEPTION UNIT
32 TRANSMISSION UNIT
42 PERSON DICTIONARY INFORMATION (EXAMPLE OF DICTIONARY INFORMATION)
43 SOUND DICTIONARY INFORMATION (EXAMPLE OF DICTIONARY INFORMATION)
51 MAP GENERATION UNIT
52 SOUND DETECTION UNIT (AN EXAMPLE OF DETECTION UNIT)
53 SOUND SOURCE ESTIMATION UNIT
54 PERSON DETECTION UNIT (EXAMPLE OF DETECTION UNIT)
55 DETERMINATION UNIT
56 NOTIFICATION INFORMATION GENERATION UNIT
57 UPDATE UNIT

The invention claimed is:

1. An information processing device comprising:
a transmission unit that transmits, on a basis of rule information set in advance and a sensing result by a sensor that senses environment information on a predetermined area, notification information based on the sensing result to a terminal device;

a reception unit that receives, from the terminal device, feedback information for the notification information transmitted by the transmission unit; and an update unit that updates the rule information on a basis of the feedback information received by the reception unit.

2. The information processing device according to claim 1, further comprising:

a detection unit that detects, on a basis of dictionary information serving as a reference of detecting a predetermined event in the rule information, the event from the sensing result; and a determination unit that determines whether or not the event detected by the detection unit meets condition information indicating a transmission condition for transmitting the notification information in the rule information, wherein the transmission unit transmits the notification information regarding the event determined to meet the transmission condition by the determination unit.

3. The information processing device according to claim 2, wherein the detection unit detects an abnormality in the predetermined area as the event.

4. The information processing device according to claim 3, wherein the determination unit determines that the transmission condition is met in a case where an occurrence time of the abnormality is not a permitted time at which occurrence of the abnormality is permitted in the transmission condition.

5. The information processing device according to claim 3, wherein the determination unit determines that the transmission condition is met in a case where an occurrence point of the abnormality is not a permitted point at which occurrence of the abnormality is permitted in the transmission condition.

6. The information processing device according to claim 3, wherein the detection unit detects the abnormality in a case where a person reflected in image data that is the sensing result is not a permitted user registered in the dictionary information.

7. The information processing device according to claim 3, wherein the detection unit detects the abnormality in a case where sound data that is the sensing result is not a permitted sound registered in the dictionary information.

8. The information processing device according to claim 7, wherein in the dictionary information, a daily life sound is registered as the permitted sound.

9. The information processing device according to claim 1, wherein the update unit deletes information that has not been used for a predetermined period in the rule information.

10. The information processing device according to claim 3, wherein the detection unit determines a level of the abnormality by comparing a degree of similarity between a feature value registered in the dictionary information and a feature value of the sensing result, with a plurality of thresholds, and the transmission unit transmits the notification information to which a degree of importance depending on the level is given.

11. The information processing device according to claim 10, wherein the update unit updates the threshold on the basis of the feedback information.

12. The information processing device according to claim 1, wherein the transmission unit collectively transmits a plurality of pieces of the notification information based on the rule information identical into one piece of the notification information.

13. The information processing device according to claim 3, wherein the reception unit receives, as the feedback information, correctness information regarding correctness of the abnormality indicated by the notification information, and the update unit updates the condition information on a basis of the correctness information.

14. The information processing device according to claim 13, wherein the update unit updates the dictionary information on the basis of the correctness information.

15. The information processing device according to claim 2, wherein the transmission unit transmits, as the notification information, information regarding at least one of an occurrence position of the event, an occurrence time of the event, a position where the event has been detected, or the sensing result serving as a basis of the event.

16. The information processing device according to claim 15, wherein the transmission unit transmits information regarding an imaging direction in which the image data has been imaged as the notification information in a case where the sensing result in which the event has been detected is image data.

17. The information processing device according to claim 1, wherein the information processing device is a mobile robot.

18. A method, by a computer, comprising:

transmitting, on a basis of rule information set in advance and a sensing result by a sensor that senses environment information on a predetermined area, notification information based on the sensing result to a terminal device;

receiving, from the terminal device, feedback information for the notification information transmitted; and updating the rule information on a basis of the feedback information received.

19. A non-transitory program causing a computer to function as: a transmission unit that transmits, on a basis of rule information set in advance and a sensing result by a sensor that senses environment information on a predetermined area, notification information based on the sensing result to a terminal device; a reception unit that receives, from the terminal device, feedback information for the notification information transmitted by the transmission unit; and an update unit that updates the rule information on a basis of the feedback information received by the reception unit.

\* \* \* \* \*